(12) United States Patent
Nemcek

(10) Patent No.: US 6,968,588 B2
(45) Date of Patent: Nov. 29, 2005

(54) GOLF CART WHEEL CLEANER

(75) Inventor: Daniel D. Nemcek, Medina, OH (US)

(73) Assignee: Nemcek Enterprises, Inc., Medina, OH (US)

( * ) Notice: Subject to any disclaimer, the term of this patent is extended or adjusted under 35 U.S.C. 154(b) by 23 days.

(21) Appl. No.: 10/600,094

(22) Filed: Jun. 20, 2003

(65) Prior Publication Data

US 2004/0016070 A1    Jan. 29, 2004

Related U.S. Application Data

(60) Provisional application No. 60/398,438, filed on Jul. 25, 2002.

(51) Int. Cl.[7] .................................................. B60S 3/06
(52) U.S. Cl. ...................... 15/53.4; 15/88.1; 15/97.3; 15/256.5; 15/DIG. 2
(58) Field of Search ................. 15/53.4, 88.1–88.3, 15/103.5, 97.3, 256.5–256.53, DIG. 2

(56) References Cited

U.S. PATENT DOCUMENTS

| | | | |
|---|---|---|---|
| 570,610 A | * | 11/1896 | Schock ........................... 15/58 |
| 1,694,197 A | | 12/1928 | Woodling |
| 1,909,869 A | | 5/1933 | Randrup |
| 2,857,605 A | * | 10/1958 | Weishaar ..................... 15/53.4 |
| 3,729,763 A | * | 5/1973 | Coley .......................... 15/53.4 |
| 3,903,559 A | * | 9/1975 | Kuster et al. ................. 15/53.4 |
| 4,233,703 A | | 11/1980 | Clyne et al. |
| 4,841,591 A | | 6/1989 | Candow |
| 4,917,125 A | | 4/1990 | Midkiff |
| 4,979,536 A | | 12/1990 | Midkiff |
| 5,261,433 A | | 11/1993 | Smith |
| 5,454,391 A | | 10/1995 | Cheung et al. |
| 6,434,781 B1 | | 8/2002 | Guerra |
| 6,671,917 B2 | * | 1/2004 | Nishina ....................... 15/53.4 |

* cited by examiner

Primary Examiner—John Kim
Assistant Examiner—Shay L. Balsis
(74) Attorney, Agent, or Firm—Hahn, Loeser & Parks LLP

(57) ABSTRACT

A golf cart wheel cleaner comprises a platform; at least one drive member operably attached to a motor, wherein the at least one drive member is adapted to rotatably turn a golf cart wheel when the golf cart wheel is properly positioned on the platform; and a cleaning member adapted to remove debris from the golf cart wheel while the golf cart wheel is being rotated.

20 Claims, 3 Drawing Sheets

GOLF CART WHEEL CLEANER

This application claims priority from U.S. Application Ser. No. 60/398,438, filed Jul. 25, 2002, which is hereby incorporated herein by reference.

TECHNICAL FIELD

The present invention relates generally to manually propelled golf carts. More specifically, the present invention relates to a wheel cleaner for manually propelled golf carts.

BACKGROUND OF THE INVENTION

Although the vast majority of golf courses offer motorized carts for golfers to ride while enjoying a round of golf, many golfers still walk the course, either because they enjoy the physical exercise from walking or because riding in a motorized cart is more costly. Many golfers who routinely walk while golfing use a manually propelled golf cart ("golf cart").

Golf carts are widely known in the art, and usually comprise of a pair of wheels attached to a stand. A golf bag attaches to the stand portion of the golf cart, such that the golfer can wheel his golf bag around the course.

One problem associated with golf carts is that during a round of golf, the wheels of the golf cart often accumulate debris, such as dirt, mud, leaves, and other unwanted substances. Since many golfers own their own golf cart, they must transport the golf cart back home. Accordingly, golfers must either manually clean the golf cart wheels, or transport the golf cart without cleaning the wheels. The primary disadvantage of transporting a golf cart with soiled wheels is that dirt and other debris accumulate within the vehicle.

One prior art device for cleaning golf cart wheels utilizes a pair of elongated, horizontally extending brushes that have downwardly pointing bristles. As the golf bag is manually wheeled through the device, the bristles remove dirt and other debris from the wheels. One problem with this device is that the golfer must use manual force to pull the golf cart through the cleaner. A second problem with this device is that it takes up significant horizontal space, since the brushes extend horizontally.

A second prior art device uses a trough of liquid. As with the aforementioned prior art device, the user again must pull the golf cart through the cleaner. Additionally, this device uses a liquid which must be periodically replaced and refilled. Further, this device leaves the wheel wet.

Accordingly, there is a need for a device that simply, quickly, and efficiently cleans the wheels of golf carts with a minimum use of manual force. Accordingly, the present invention is hereby submitted.

SUMMARY OF THE INVENTION

This invention is directed to a golf cart wheel cleaner. In a preferred embodiment, a golf cart wheel cleaner comprises a platform; at least one drive member operably attached to a motor, wherein the at least one drive member is adapted to rotatably turn a golf cart wheel; and a cleaning member adapted to remove debris from the golf cart wheel while the golf cart wheel is being rotated.

DETAILED DESCRIPTION OF THE INVENTION

The present invention will now be described in more detail, and with reference to the appended drawings.

Figure 1:
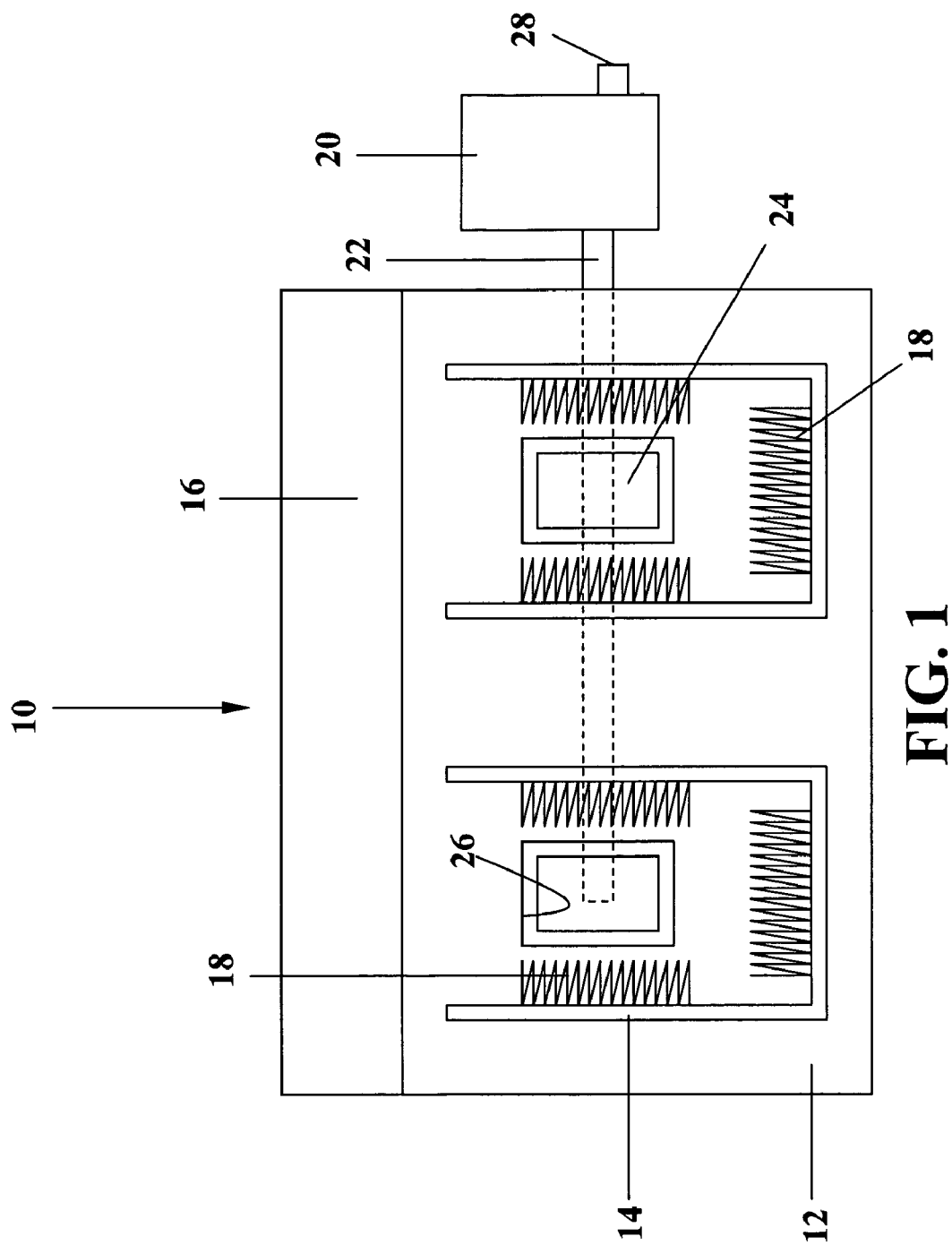
FIG. 1 is a top plan view a golf cart wheel cleaner, in accordance with a preferred embodiment of the present invention.

A preferred embodiment of a golf cart wheel cleaner ("cleaner"), generally identified by reference number 10, is illustrated in FIG. 1. The cleaner 10 comprises a platform 12 having a plurality of retaining walls 14. The retaining walls 14 define spaces that are adapted to receive the golf cart wheels 30. It is contemplated that the retaining walls 14 could be of different sizes and shapes, or could be omitted altogether from the cleaner 10. A ramp 16 is preferably attached to the front of the platform 12, so that the golf cart can be wheeled onto the platform 12 and into the spaces defined by the retaining walls 14.

The platform 12, ramp 16, and retaining walls 14 can be constructed from wood, plastic, metal, ceramic, or any of a plurality of other rigid materials known in the art. The platform 12 can be box-like, with two horizontally-extending surfaces and four vertically-extending sides. However, the platform may also be formed into any of a plurality of other shapes, sizes and structures that facilitate a horizontal surface positioned above a ground surface. For example, the platform 12 could resemble a table, with a horizontally-extending surface and a plurality of legs attached to the horizontally-extending surface.

Figure 2:
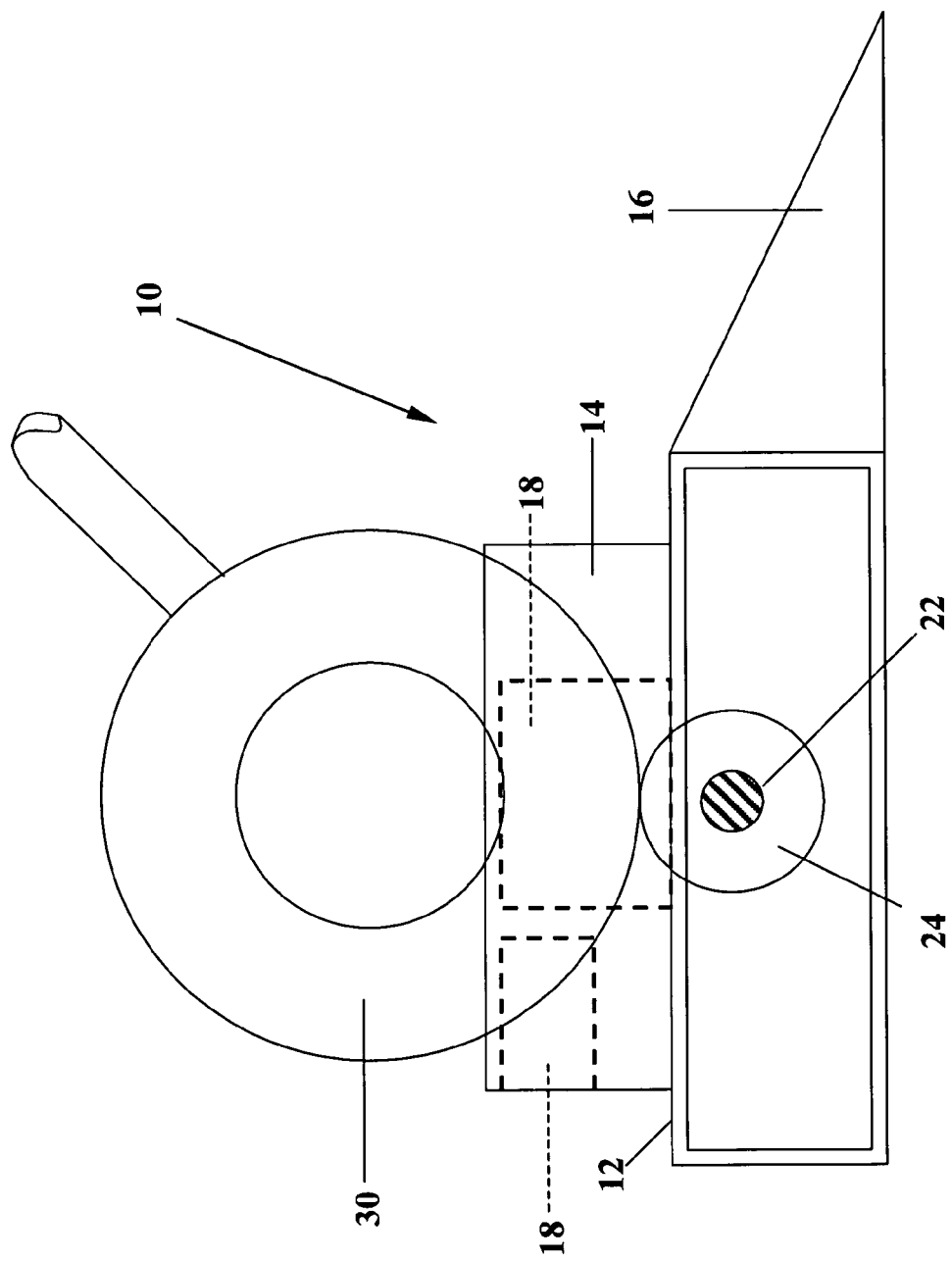
FIG. 2 is a left side view of the golf cart wheel cleaner illustrated in FIG. 1, with the wheels of a golf cart positioned thereon.

The platform 12 preferably has two apertures 26 located within the area defined by the retaining walls 14. The apertures 26 overlay drive members 24, which may extend partially through the apertures 26, as illustrated in FIG. 2. It is also contemplated that drive members 24 may be flush with apertures 26 or located below apertures 26. It should be understood that with larger apertures 26, the drive members 24 may be located lower in relation to the platform 12. It is contemplated that the drive members 24 may be located in any convenient location such that they can rotate can rotate a wheel 30 when the wheel 30 is properly positioned on the platform 12. If the drive members 24 are located entirely below the platform 12, ends of the apertures 26 may comprise idle wheels or rollers to reduce friction of a rotating golf cart wheel 30 against the aperture ends.

Drive members 24 are adapted to be engagable with golf cart wheels 30. When the golf cart wheels 30 are positioned within the area defined by the retaining walls 14, rotation of the drive members 24 causes the golf cart wheels 30 to rotate. Preferably, the drive members 24 are comprised of rubber wheels, but any of a plurality of shapes and materials known in the art are contemplated. For example, it is contemplated that the drive members may comprise rotatable belts that are located on top of the platform.

A motor 20 is operably attached to the drive members 24, such that activation of the motor 20 causes the drive members 24 to rotate. Preferably, the drive members 24 are operably attached to the motor 20 by drive shaft 22. However, any means known in the art can be utilized to operably attach the drive members 24 to the motor 20. For example, the drive members 24 could be belt-driven, with a shaft connecting the drive members 24 to each other. If the drive members 24 are shaft-driven, either the drive members 24 or the drive shaft 22 or both may be supported by hanging loops, or other supports known in the art.

Figure 3:
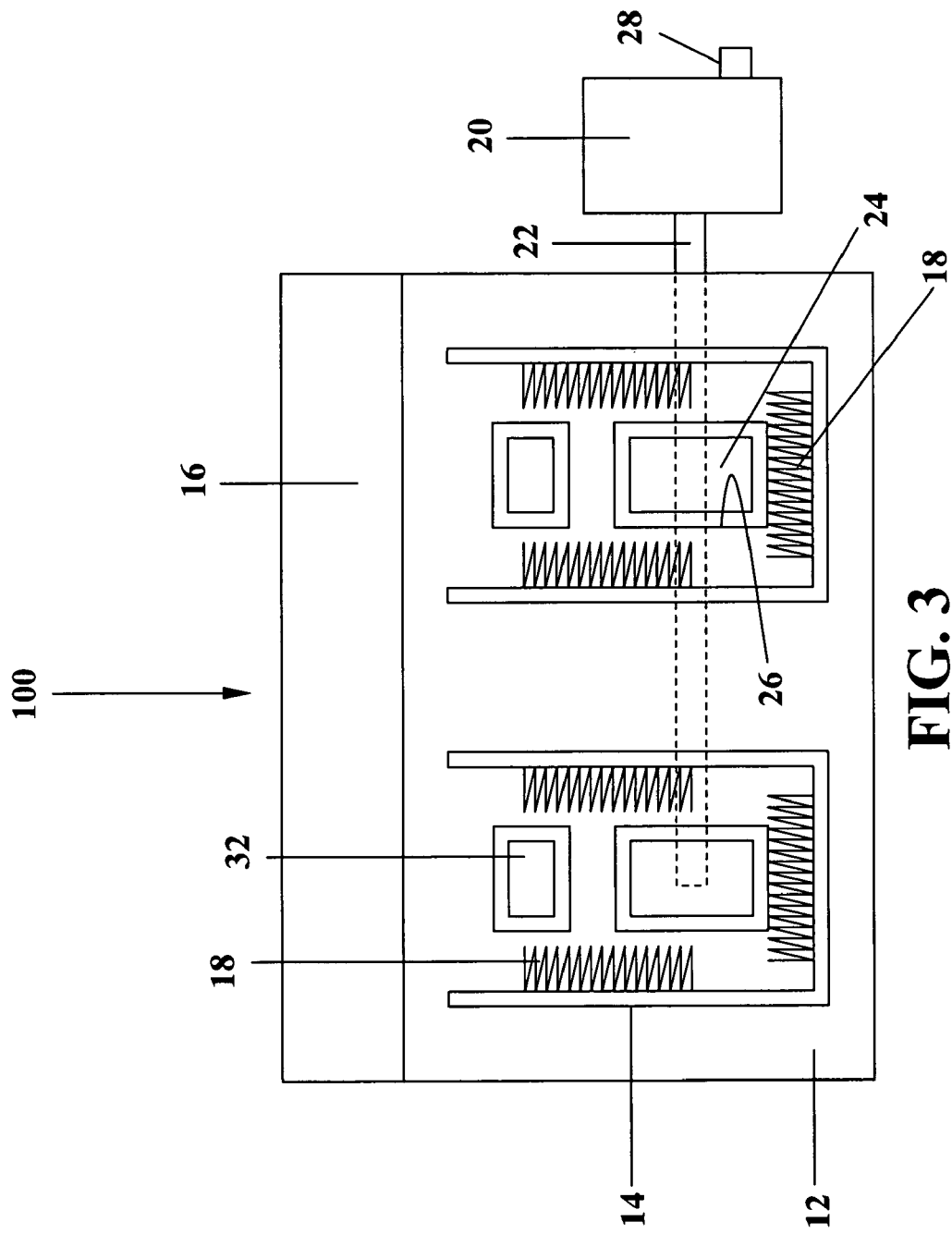
FIG. 3 is a top plan view of a second embodiment of a golf cart wheel cleaner.

Preferably, the drive members 24 rotate in such a way as to rotate the golf cart wheels 30 such that the golf cart is driven toward the rear of the cleaner 10 and toward the rear cleaning member 18, which substantially prevents the golf cart from moving linearly. However, the drive members 24 can rotate in either direction. Optionally, the cleaner may have a retainer that prevents the golf cart from moving linearly. Alternatively, a passively rotatable member, illustrated in FIG. 3, such as an idler wheel or cylinder 32, may be positioned adjacent to the drive member 24 to provide a slot for placement the golf cart wheels 30, which would prevent linear movement of the golf cart wheels.

At least one cleaning member 18 is attached to the interior of the retaining walls 14. The cleaning member 18 can be a wire brush, bristle brush, sponge, cloth, scraper, or any of a plurality of other cleaning members known in the art. Preferably, cleaning member 18 extends to both sides and the front of wheel 30.

The motor 20 preferably is operably attached to a switch 28 that turns the motor on and off. The switch 28 can be a manually operated switch, or an automatic switch. If the switch is automatic, the switch may be light-sensing, pressure-sensing, timed, metallic-sensing, or any of a plurality of automatic switches known in the art. A coin operated switch could be provided to operate motor 20.

Preferably, platform 12 includes a removable debris pan (not shown) to hold the grass, dirt and other debris that is removed from the golf cart wheels 30. To facilitate this, the upper surface of platform 12 can be formed from perforated materials or other grate-like materials. Additionally, It may be desirable to stabilize the body of the golf cart while the wheels 30 are being rotated by the cleaner 10. Therefore, it is contemplated that the golf cart wheel cleaner 10 may optionally have a cart support arm (not shown) selectively attached to the platform 12 or anchored to any convenient location, such as a ground surface. The cart support arm may attach to the golf cart by any convenient means known in the art, and may be adjustable in at least one direction, to accommodate different sizes and shapes of golf carts. It is contemplated that any other cart stabilizing means that is known in the art can be utilized without deviating from the scope of the present invention.

To use the golf cart wheel cleaner 10, a golf cart is rolled onto or otherwise positioned on the ramp 16 and golf cart wheels 30 are positioned in contact with drive members 24. Motor 20 is activated, either automatically or manually, by switch 28. Preferably, motor 20 operates for a predetermined time and automatically turns off. Motor 20 rotates drive members 24, which rotate golf cart wheels 30. Wheels 30 then rotate against cleaning member 18, which removes debris from wheels 30. Once the golf cart wheels 30 are cleaned and motor 20 has been turned off, the golf cart is removed from golf cart wheel cleaner 10.

Although the foregoing describes the cleaner 10 with reference to manually-propelled golf carts, it should be contemplated that the cleaner 10 could be utilized with a variety of wheeled vehicles. For example, the cleaner 10 may be utilized with bicycles, motorcycles, or powered golf carts. For example, it is contemplated that either the size of retaining walls 14 or the cleaning members 18 or both may be adjustable in proportion to the size of the wheel to be cleaned.

The forgoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description illustrates the present invention and is not to be construed as limited to the specific embodiments disclosed.

What is claimed is:

1. A mechanical wheel cleaner for a golf pull cart, the pull cart having at least one wheel, the at least one wheel having an inner portion, an outer portion, and a tread portion, the cleaner comprising:
   a platform;
   a motor adjacent to the platform;
   at least one drive member operably attached to the motor, the at least one drive member being adapted to selectively rotate the wheel when the wheel is positioned on the platform and in contact with the drive member;
   at least one wall extending upwardly adjacent to the at least one drive member, the at least one wall having a tread cleaner attached thereto.

2. The mechanical wheel cleaner as recited in claim 1, wherein the platform comprises at least one aperture.

3. The mechanical wheel cleaner as recited in claim 1, further comprising an idler wheel adjacent to each at least one drive member.

4. The mechanical wheel cleaner as recited in claim 1, further comprising a switch that turns the motor on and off.

5. The mechanical wheel cleaner as recited in claim 4, wherein the switch is manually actuated.

6. The mechanical wheel cleaner as recited in claim 4, wherein the switch is automatic.

7. The mechanical wheel cleaner as recited in claim 6, wherein the switch is timed.

8. The mechanical wheel cleaner as recited in claim 1, further comprising a wheel retainer adapted to prevent linear movement of the wheel.

9. The mechanical wheel cleaner as recited in claim 1, wherein the at least one wall comprises a plurality of walls selectively attached to the platform and extending upwardly around the drive member.

10. The mechanical wheel cleaner as recited in claim 1, wherein the tread cleaner comprises a brush.

11. The mechanical wheel cleaner as recited in claim 1, further comprising means for elevating the platform.

12. The mechanical wheel cleaner as recited in claim 11, further comprising a ramp selectively attached to the platform.

13. The mechanical wheel cleaner as recited in claim 1, wherein the number of drive members is two, each drive member being adapted to rotate a wheel.

14. The mechanical wheel cleaner as recited in claim 1, wherein the wheel cleaner is adapted to simultaltaneously clean two wheels of the golf pull cart.

15. The mechanical wheel cleaner as recited in claim 1, wherein the tread cleaner is non-rotatable.

16. A golf pull cart wheel cleaner, comprising:
   a platform;
   a motor adjacent to the platform;

at least one drive member operably attached to the motor, wherein each at least one drive member is adapted to selectively rotate a golf cart wheel when the golf cart wheel is positioned on the platform;

at least one wall extending upwardly adjacent to the at least one drive member; and, at least one cleaning member positioned on the at least one wall, the at least one cleaning member adapted to remove debris from a tread surface of the golf cart wheel while the golf cart wheel is being rotated by the at least one drive member.

17. A golf cart wheel cleaner that removes debris simultaneously from two wheels of a manually-propelled golf cart, each wheel including an inside portion, and outside portion, and a tread portion, the golf cart wheel cleaner comprising:

at least one wheel rotator adapted to rotate the two wheels simultaneously;

means for substantially preventing linear movement of the two wheels while the wheels are being rotated;

at least one upstanding retaining wall extending upwardly adjacent to at least one wheel rotator; and means, affixed to the at least one upstanding retaining wall, for removing debris simultaneously from the inside portion, the outside portion, and the tread portion of the wheels while the wheels are being rotated.

18. The golf cart wheel cleaner as recited in claim 17, wherein the cleaning means is non-rotatable.

19. A golf cart wheel cleaner, comprising:

a platform adapted to be elevated from a ground surface, the platform having two apertures therein;

three upstanding walls extending upwardly around each aperture;

two drive member wheels operably connected to a motor by a drive shaft extending beneath the platform, each drive member wheel being adapted to rotate a golf cart wheel when the golf cart wheel is positioned on the platform; and, at least one cleaning member attached to at least one of the three upstanding side walls and being adapted to remove debris from the golf cart wheels while the golf cart wheels are being rotated by the drive member wheels.

20. The golf cart wheel cleaner as recited in claim 19, wherein the cleaning members are non-rotatable.

* * * * *